(12) United States Patent
Tsutsui et al.

(10) Patent No.: US 7,703,983 B2
(45) Date of Patent: Apr. 27, 2010

(54) SLIDING MATERIAL AND SLIDING BEARING

(75) Inventors: Hideyuki Tsutsui, Kuwana (JP);
Masakazu Hirata, Kuwana (JP);
Masaki Egami, Kuwana (JP)

(73) Assignee: NTN Corporation, Osaka (JP)

( * ) Notice: Subject to any disclaimer, the term of this patent is extended or adjusted under 35 U.S.C. 154(b) by 594 days.

(21) Appl. No.: 11/628,484

(22) PCT Filed: Jun. 9, 2005

(86) PCT No.: PCT/JP2005/010568

§ 371 (c)(1),
(2), (4) Date: Nov. 30, 2006

(87) PCT Pub. No.: WO2005/121288

PCT Pub. Date: Dec. 22, 2005

(65) Prior Publication Data

US 2007/0232502 A1     Oct. 4, 2007

(30) Foreign Application Priority Data

Jun. 10, 2004 (JP) .............................. 2004-172789
Jun. 22, 2004 (JP) .............................. 2004-184123
Aug. 30, 2004 (JP) .............................. 2004-250439

(51) Int. Cl.
*F16C 33/02* (2006.01)
*F16C 33/12* (2006.01)
*F16C 17/00* (2006.01)

(52) U.S. Cl. ...................... 384/279; 384/276; 384/297; 384/907

(58) Field of Classification Search ................. 384/107, 384/133, 276, 279, 286, 297, 907; 428/143, 428/147, 149, 101, 156, 457–458, 626; 508/136; 524/425, 427, 447, 449; 502/435; 162/17–19, 162/68, 67
See application file for complete search history.

(56) References Cited

U.S. PATENT DOCUMENTS 3,647,500 A  *  3/1972  Mizuno ...................... 428/143

(Continued)

FOREIGN PATENT DOCUMENTS

JP           57100141 A  *  6/1982

(Continued)

OTHER PUBLICATIONS

International Search Report, Sep. 20, 2005.

*Primary Examiner*—Marcus Charles
(74) *Attorney, Agent, or Firm*—Hedman & Costigan; James V. Costigan (57) ABSTRACT

A sliding material including a resinous porous article having an interconnected hole porosity of not less than 30% and a lubricating oil which impregnates the resinous porous article is disclosed. The resinous porous article has an interconnected hole formed by molding a resin mixed with a pore-forming substance into said resin, and extracting said pore-forming substance from said molded article with a solvent which dissolves said pore-forming substance and does not dissolve said resin. A sliding bearing composed of a sliding material having a sliding surface which slides on a mating member and a lubricating oil supply layer which supports the sliding material and supplies the sliding surface with the lubricating oil.

13 Claims, 5 Drawing Sheets

U.S. PATENT DOCUMENTS

| | | | | |
|---|---|---|---|---|
| 3,802,878 | A * | 4/1974 | Lindstrom | 419/2 |
| 4,104,176 | A * | 8/1978 | Bidler | 508/107 |
| 4,244,778 | A * | 1/1981 | Lindahl et al. | 162/17 |
| 5,631,060 | A * | 5/1997 | Saiki et al. | 428/101 |
| 5,731,373 | A * | 3/1998 | Hirose et al. | 524/447 |
| 5,810,481 | A * | 9/1998 | Nii et al. | 384/279 |
| 6,569,816 | B2 * | 5/2003 | Oohira et al. | 508/107 |
| 6,669,371 | B2 * | 12/2003 | Tanaka et al. | 384/279 |
| 2002/0001420 | A1 * | 1/2002 | Tanaka et al. | 384/279 |
| 2003/0022797 | A1 * | 1/2003 | Oohira et al. | 508/107 |
| 2003/0138172 | A1 | 7/2003 | Yabe et al. | |
| 2004/0265350 | A1 * | 12/2004 | Sambrook et al. | 424/423 |

FOREIGN PATENT DOCUMENTS

| | | | |
|---|---|---|---|
| JP | 61-0064329 | | 1/1986 |
| JP | 06137326 | A * | 5/1994 |
| JP | 08176441 | A * | 7/1996 |
| JP | 08283518 | A * | 10/1996 |
| JP | 2001031415 | A * | 2/2001 |
| JP | 2001 81227 | A | 3/2001 |
| JP | 2001152175 | A * | 6/2001 |
| JP | 2002-129183 | A | 5/2002 |
| JP | 2002-194131 | | 7/2002 |
| JP | 2002-364647 | A | 12/2002 |
| JP | 2003-073497 | | 3/2003 |
| JP | 2003-301920 | | 10/2003 |
| JP | 2003-343579 | A | 12/2003 |
| JP | 2004-036788 | | 2/2004 |
| SU | 1263680 | A1 * | 10/1986 |

* cited by examiner

SLIDING MATERIAL AND SLIDING BEARING

CROSS REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

BACKGROUND OF THE INVENTION (1) Field of the invention

The present invention relates to a sliding material for forming a sliding member and to a sliding bearing composed of the sliding material, and relates to a sliding material for forming a sliding member that is used in a clean atmosphere and a low-pressure atmosphere such as under vacuum, and the like, and a sliding bearing which can be suitably used for a mating member made of a soft material or a sliding bearing demanded to have a high rotational accuracy.

(2) Description of Related Art

Including information disclosed under 37 CFR1.97 and 1.98

The sliding member obtained by molding the sliding material such as a resin composition having lubricating property is severely demanded to have higher function year by year, and is strongly demanded to have a low friction and low wear in an initial state and maintain an initial sliding property thereof for a long time. When a resinous material containing the lubricating oil is used as the above-described sliding material, improvement of the sliding property thereof has been aimed by adjusting the affinity of lubricating oil for resin serving as a base material, mixing a filler serving as a conductive path of the lubricating oil with the resin, and adjusting a mixing condition. In recent years, there is disclosed a sliding material whose sliding property has been improved by using the resinous material (patent document 1) mixed with the porous silica impregnated with the lubricating oil.

In a sliding material which is used in a closed clean atmosphere such as in semiconductor-manufacturing equipment and particularly in a sliding material which is used in a low-pressure clean atmosphere such as under vacuum, vapor generated from a lubricant and scattered fine particles may adversely affect the performance of precision parts. Thus the sliding material is demanded to have a very low out particle performance in addition to the above-described demanded properties. As a filler for use in the sliding material, a liquid lubricant having a low vapor pressure; a solid lubricant such as polytetrafluoroethylene, molybdenum disulfide, tungsten disulfide, and the like; and a soft metal such as gold, silver, and the like are used.

To prevent the lubricating oil from being decomposed when the conventional sliding material containing the lubricating oil is molded into the sliding member, it is necessary to select a lubricating oil heat-resistant to a molding temperature of resin. Thus "super engineering plastics" having a high molding temperature cannot be used as the resin.

When the sliding material is used for a member to be used in a vacuum condition, the conventional sliding material has a problem that even when the vapor pressure of the lubricating oil used therefor is low to such an extent that it is capable of withstanding a vacuum condition, the sliding material cannot be used when the decomposition temperature of the lubricating oil is low.

In improving the mechanical strength of the resinous material by mixing a reinforcing material made of fiber or the like with resin, the wetting property of the fiber with the resin is important. It is difficult to sufficiently improve the strength of the resinous material owing to the influence of the lubricating oil mixed with the resin. To secure a predetermined supply amount of the resinous material without slipping the resin on a screw in an injection molding time, the amount of the lubricating oil which can be mixed with the resin is up to a maximum of about 10 vol %. In dependence on a use condition, the amount of the lubricating oil may be short.

In the resinous material (patent document 1) mixed with the porous silica impregnated with the lubricating oil, the mixing amount of the lubricating oil is allowed to be larger than that of the conventional resinous material. Even in this resinous material, the mixing amount of the lubricating oil is up to a maximum of 30 vol %. In environment where a member composed of the resinous material is used in a severe condition, there is a possibility that the lubricating oil is short. Further, the problem of selecting the resin and the lubricating oil remains unsolved. Thus it is difficult to use the resinous material in environment where the resinous material is required to be heat-resistant.

It cannot be said that the sliding material for a solid body-lubricating method used in the above-described clean atmosphere and low-pressure atmosphere such as in the semiconductor-manufacturing equipment has a sufficient sliding performance in a severe use condition, for example, a high load and a high speed. For example, because the polytetrafluoroethylene melts and wears owing to heat generated thereby in a high speed condition, the polytetrafluoroethylene has a low wear resistance. The molybdenum disulfide is used mainly as a coating material. In a high load condition, a thin coating film is liable to peel off.

As an application example of the oil-containing sliding material, sliding bearings such as an oil-containing bearing composed of a sintered metal and an oil-containing bearing composed of a resin are known. The oil-containing bearing composed of the sintered metal has an advantage that it does not wrap around a mating shaft and can be processed with a high accuracy, but has a disadvantage that it wears the mating shaft made of a soft metal. The oil-containing bearing composed of the resin has an advantage that it has self-lubricating property by dispersing the lubricating oil in a resin molding and does not attack a mating member made of a soft material, but is composed of a resinous material having a larger coefficient of linear thermal expansion and a larger coefficient of water absorption than a metal material. Thus when a service temperature has a wide region, the bearing wraps around the shaft owing to a contraction of the resin at a low temperature. Further at a high temperature, the expansion of the volume thereof is restrained by an outer-diameter side housing and hence shifts toward an inner-diameter side of the bearing. Thereby the inner diameter thereof becomes small, and the sliding bearing wraps around the shaft.

Therefore the development of a sliding bearing has been made by utilizing the advantages of both bearings and covering up the disadvantages thereof. For example, as an application to a field demanded to have a high rotational accuracy, a sliding bearing having a plurality of layers composed of the metal material layer and the coating layer of resin, having a thickness of about 20 μm, which is applied to the surface of the metal material layer is disclosed. Also disclosed is a sliding bearing having a high dimensional accuracy and not wearing the mating member made of a soft material. The sliding bearing has the porous resin layer formed as the sliding surface which slides on a shaft, and the sintered metal layer, disposed at the outer-diameter side of the sliding bearing, which serves as the lubricating oil supply layer (patent document 2).

In recent years, the sliding bearing for use in office appliances are severely demanded year by year to have a higher extent in the rotational accuracy and durability thereof. Thus even in the sliding bearing having a plurality of layers, when the solid lubricant becomes ineffective, the coating film peels off the surface of the metal material, and thus the metal material disposed below the coating film is exposed. Thus the sliding bearing is inferior in its durability. Even in the case where the sliding surface consists of the porous resin layer, the sliding bearing is incapable of obtaining the sliding property satisfying the above-described demanded performance in dependence on an interconnected hole porosity of the porous resin layer.

Patent document 1: Japanese Patent Application Laid-Open No.2002-129183

Patent document 2: Japanese Patent Application Laid-Open No.2002-364647

A sliding material of the present invention includes a resinous porous article having an interconnected hole porosity of not less than 30% and a lubricating oil which impregnates the resinous porous article. The resinous porous article has an interconnected hole formed by molding a resin mixed with a pore-forming substance into said resin, and extracting said pore-forming substance from said molded article with a solvent which dissolves said pore-forming substance and does not dissolve said resin.

It is an object of the present invention to allow a sliding material containing a lubricating oil to have a high mechanical strength and contain the lubricating oil at a high ratio and combine the sliding material and the lubricating oil with each other at a desired ratio in dependence on a use and a specification.

It is another object of the present invention to provide a sliding material in which a gas is not generated from the lubricating oil, even when the sliding material is used under vacuum and which is low out particle.

It is still another object of the present invention to provide a sliding bearing composed of the above-described sliding material and particularly a sliding bearing which can be suitably used for a mating member made of a soft material or a sliding bearing demanded to have a high rotational accuracy.

DETAILED DESCRIPTION OF THE INVENTION

The pore-forming substance is at least one compound selected from compounds of inorganic salts and compounds of organic salts and is particularly an alkali substance.

When the sliding material is used for a member which is used under vacuum, the lubricating oil has a vapor pressure of not more than $1.0 \times 10^{-5}$ Pa at 40° C.

The sliding bearing of the present invention has a sliding material having a sliding surface which slides on a mating member; and a lubricating oil supply layer which supports the sliding material and supplies the sliding surface with the lubricating oil. The above-described sliding material is formed of the sliding material of the present invention. The above-described lubricating oil supply layer is formed of a sintered metal.

Because the sliding material of the present invention is obtained by impregnating the resinous porous article having the interconnected hole porosity of not less than 30% with the lubricating oil, an arbitrary resin can be selected in dependence on a use and a specification. Thus, the sliding material of the present invention has a high strength, a high heat resistance, a low coefficient of friction, and excellent in a wear resistance.

Because the resinous porous article has the interconnected hole porosity of not less than 30%, the sliding member obtained from the sliding material is supplied with the lubricating oil for a long time from the sliding material, and displays an excellent durability. Further the sliding member has a small torque required for rotation. Thus by using a sliding bearing or a sliding sheet obtained from the sliding material of the present invention for a driving apparatus such as a motor, it is possible to make the apparatus compact.

It is possible to select the lubricating oil, impregnating the sliding material, which has the vapor pressure of not more than $1.0 \times 10^{-5}$ Pa at 40° C. Therefore in a vacuum condition ($1.0 \times 10^{-4}$ Pa), it is possible to obtain the sliding material which does not vaporize the lubricating oil, has a low particle performance, has an excellent durability, and can be used for a long time.

The sliding bearing composed of the sliding material of the present invention is capable of supplying the lubricating oil to the sliding surface continuously for a long time. Consequently the sliding bearing is capable of maintaining a low coefficient of friction for a long time and suppressing the generation of an abnormal noise which is caused by a metal contact.

Because the resinous porous article layer forming the sliding surface is obtained by carrying out the method of molding the above-described sliding material, it is possible to arbitrarily select a resin and a filler in dependence on a material of a mating shaft and a use condition and provide the resinous porous article layer with a high strength, a high heat resistance, a low coefficient of friction, and a high wear resistance.

Because the lubricating oil supply layer is formed of the sintered metal, the linear expansion thereof is almost equal to those of ordinary metal materials of housings or shafts, is excellent in the dimensional accuracy and rotational accuracy thereof, and does not wear a mating shaft made of a soft material.

The sliding material of the present invention is obtained by impregnating a resinous porous article having an interconnected hole formed by molding a resin mixed with a pore-forming substance into said resin, and extracting said pore-forming substance from said molded article with a solvent which dissolves said pore-forming substance and does not dissolve said resin.

The sliding material can be used as a material of an arbitrary sliding member by selecting a resin and a lubricating oil independence on a use and a specification. As the sliding member, a sliding bearing, a gear, a sliding sheet, a seal ring, a roller, a retainer of a rolling bearing, a seal of the rolling bearing, a seal of the linear bearing, a spacer interposed between balls of a ball thread, a race of a rolling bearing, and carriages are listed.

A resin, a pore-forming substance, and a filler composing the sliding material of the present invention; a molding method; and an extracting method are described below.

As a form of most densely packing a sphere by a point contact, a face-centered cubic lattice and a hexagonal closest packing are known. The packing percentage thereof is calculated by (volume of sphere÷volume of circumscribed cube)÷(height of equilateral triangle÷base)÷(height of regular tetrahedron÷one side) and is both 74%. The interconnected hole porosity defined as (100-packing percentage) is 26%.

The above-described computation is performed on the assumption that spheres having the same size are packed. When spheres having a plurality of sizes are packed, the packing percentage is higher and the interconnected hole porosity becomes lower than those of the hexagonal closest packing.

When powdery spherical resin particles are compression-molded and then sintered, point contact is impossible but the spherical resin particles deform and make face contacts. Therefore the packing percentage is higher and the interconnected hole porosity becomes lower than those of the hexagonal closest packing. Thus the interconnected hole porosity of the conventional sintered resinous material is up to a maximum of 20%.

The definition of the interconnected hole porosity used in the present invention is almost the same as that of the above-described interconnected hole porosity and means the interconnected hole porosity when pores are continuous. That is, the interconnected hole porosity means the ratio of the total volume of the pores continuous with one another to the volume of the resinous molding.

More specifically, the interconnected hole porosity is calculated by the method shown by an equation (1) in "numerical equation 1".

Numerical Equation 1

$$\underbrace{\dfrac{\overbrace{V, \rho, W}^{[Before\ Cleaning]}}{\underbrace{\dfrac{V_2}{\rho_2}}_{\substack{Pore\text{-}forming\\substance}} \quad \underbrace{\dfrac{V_1}{\rho_1}}_{Resin}}}_{} \quad \underbrace{\dfrac{\overbrace{V_3, W_3}^{[After\ cleaning]}}{\underbrace{\dfrac{V_2'}{W_2}}_{Pore} \quad \underbrace{\dfrac{V_1}{\rho_1}}_{Pore\text{-}forming\ substance} \quad \underbrace{\dfrac{W_1}{Resin}}_{}}}_{} \qquad (1)$$

$$\text{Interconnected hole porosity}(\%) = (1 - V_3/V) \times 100$$

$$V_3 = V_2' + V_1$$

$$V_2' = (W_3 - W_1)/\rho_2$$

In the above-described equation 1, meanings of each reference symbols are shown below:
V: Volume of molding formed by heating compression molding method before cleaning
ρ: Density of molding formed by heating compression molding method before cleaning
W: Weight of molding formed by heating compression molding method before cleaning
$V_1$: Volume of resinous powder
$\rho_1$: Density of resinous powder
$W_1$: Weight of resinous powder
$V_2$: Volume of pore-forming substance
$\rho_2$: Density of pore-forming substance
$W_2$: Weight of pore-forming substance
$V_3$: Volume of porous article after cleaning
$W_3$: Weight of porous article after cleaning
$V'_2$: Volume of pore-forming substance remaining in porous article after cleaning In the present invention, by using a producing method described below, the resinous porous article having an interconnected hole porosity not less than 30% and favorably 30% to 90% and more favorably 30% to 70% is obtained.

The resinous porous article which can be used in the present invention is formed by molding the resin mixed with the pore-forming substance into said resin, and extracting said pore-forming substance from said molded article with a solvent which dissolves said pore-forming substance and does not dissolve said resin. For example, after a resin A which is molded at X° C. is mixed with a water-soluble powder B having a melting point Y° C. higher than X° C. to obtain a molding by molding a mixture at X° C., the water-soluble powder B is extracted from the molding with water. Thereby the porous article is obtained.

As resins usable in the present invention, it is possible to use resinous powder and a pellet of thermoplastic resin, thermosetting resin, elastomer or rubber. When the resinous powder and the pellet are molded by fusing them, they are kneaded together with the pore-forming substance. Therefore the particle diameter and configuration of the resinous powder and the pellet are not specifically limited. When they are dry-blended and molded by compressing them, it is preferable that an average particle diameter is 1 to 500 μm.

As the thermoplastic resin or the thermosetting resin, it is possible to list polyethylene resin such as low-density polyethylene, high-density polyethylene, an ultra-high-molecular-weight polyethylene; modified polyethylene resin, water-bridged polyolefin resin, polyamide resin, aromatic polyamide resin, polystyrene resin, polypropylene resin, silicone resin, urethane resin, polytetrafluoroethylene resin, chlorotrifluoroethylene resin, tetrafluoroethylene-hexafluoropropylene copolymer resin, tetrafluoroethylene-perfluoroalkyl vinyl ether copolymer resin, vinylidene fluoride resin, ethylene-tetrafluoroethylene copolymer resin, polyacetal resin, polyethylene terephthalate resin, polybutylene terephthalate resin, polyphenylene ether resin, polycarbonate resin, aliphatic polyketone resin, polyvinyl pyrrolidone resin, polyoxazoline resin, polyphenylene sulfide resin, polyether sulfone resin, polyether imide resin, polyamide imide resin, polyether ether ketone resin, thermoplastic polyimide resin, thermosetting polyimide resin, epoxy resin, phenol resin, unsaturated polyester resin, vinyl ester resin. It is also possible to exemplify mixtures, namely, polymer alloys each consisting of not less than two kinds of the above-described synthetic resins.

As the elastomer or the rubber, it is possible to exemplify vulcanized rubbers such as acrylonitrile butadiene rubber, isoprene rubber, styrene rubber, butadiene rubber, nitrile rubber, chloroprene rubber, butyl rubber, acrylic rubber, silicone rubber, fluororubber, ethylene propylene rubber, chlorosulfonated polyethylene rubber, chlorinated polyethylene rubber, and epichlorohidrin rubber; and thermoplastic elastomers such as polyurethane elastomer, polyester elastomer, polyamide elastomer, polybutadiene elastomer, and soft nylon elastomer.

In the case where the sliding material of the present invention is used under a vacuum condition, the thermal conductivity is lower in the vacuum condition than in the air. Thus frequently the bearing is used at a high temperature. Therefore, of the resins listed above, the polytetrafluoroethylene resin, the polyether ether ketone resin, and the polyimide resin are preferable because these resins are heat-resistant.

As the pore-forming substance, it is possible to use a substance, having a melting point higher than that of a resin-molding temperature, which is added to the resin to mold a mixture of the pore-forming substance and the resin into a molding and can be extracted from the molding by using a solvent not dissolving the resin therein.

As the pore-forming substance, compounds of inorganic salts, compounds of organic salts, and mixtures of these compounds are preferable. The pore-forming substance consisting of a water-soluble substance which makes it easy to perform cleaning and extraction steps is especially preferable. An alkali substance is also favorable. A weak alkali substance that can be used as a rust preventive agent is more favorable. As the weak alkali salts, organic alkali metal salts, organic alkali earth metal salts, inorganic alkali metal salts, and inorganic alkali earth metal salts are listed. It is preferable to use the organic alkali metal salts and organic alkali earth metal salts because these salts are soft and hardly damage a rolling surface and a sliding surface, even when an unextracted portion of the pore-forming substance drops. These metal salts can be used singly or by mixing not less than two kinds thereof with each other. It is preferable to use water-soluble weak alkali salts because they allow the use of inexpensive water as a solvent for cleaning use and facilitate treatment of waste water in forming the pore.

To prevent dissolving of the pore-forming substance at a molding time, as the pore-forming substance, a substance having a melting point higher than a molding temperature of the resin to be used for the sliding material is used.

As water-soluble organic alkali metal salts that can be preferably used in the present invention, it is possible to list sodium benzoate (melting point: 430° C.), sodium acetate (melting point: 320° C.), sodium sebacate, (melting point: 340° C.), sodium succinate, and sodium stearate. The sodium benzoate, the sodium acetate, and the sodium sebacate are especially preferable because they have a high melting point respectively and are compatible with many kinds of resins.

As the inorganic alkali metal salt, potassium carbonate, sodium molybdenum, potassium molybdenum, potassium tungstate, sodium triphosphate, sodium pyrophosphate, sodium methaphosphate, calcium nitrate, and the like are listed.

An average particle diameter of the pore-forming substance is controlled according to a use of the sliding material. When the sliding material is used as a sliding bearing, the pore-forming substance having an average particle diameter not more than 1000 µm can be used.

The ratio of the pore-forming substance to the total amount of the resinous powder, the pore-forming substance, and other components including a filler is 30 vol % to 90 vol % and favorably 40 vol % to 70 vol %. If the ratio of the pore-forming substance is below 30 vol %, it is difficult for pores of the resinous porous article to be interconnected. If the ratio of the pore-forming substance exceeds 90 vol %, a desired mechanical strength cannot be obtained.

At a mixing time, a filler insoluble in the solvent which is used to extract the pore-forming substance may be used.

To improve mechanical properties of the sliding material by improving the frictional and abrasive properties thereof, appropriate filler materials can be contained therein. For example, fibers such as glass fiber, pitch-based carbon fiber, polyacrylonitrile-based carbon fiber, aramid fiber, alumina fiber, boron fiber, silicon carbide fiber, silicon nitride fiber, boron nitride fiber, quartz wool, and metal fiber; cloth formed by knitting these fibers; minerals such as calcium carbonate, lithium phosphate, lithium carbonate, calcium sulfide, lithium sulfide, talc, silica, clay, mica, and the like; inorganic whiskers such as titanium oxide whisker, potassium titanate whisker, aluminum borate whisker, calcium sulfide whisker, and the like; carbon black; graphite; polyester fiber; and thermosetting resin such as polyimide resin, polybenzimidazole resin, and the like.

To improve the sliding performance of the sliding material, the sliding material is capable of containing compounds of amino acid, polyoxybenzoylpolyester resin, polybenzoimidazole resin, liquid crystal resin, pulp of aramid resin, polytetrafluoroethylene, boron nitride, molybdenum disulfide, and tungsten disulfide.

Further, to improve the thermal conductivity of the sliding material, it may contain carbon fiber, metal fiber, graphite powder, zinc oxide, powder of aluminum nitride, and the like. Furthermore it is possible to use the above-described fillers in combination.

Additives widely applicable to synthetic resins generally used may be used in combination with the above-described fillers, provided that the addition amount thereof does not inhibit the effect of the present invention. For example, a mold release agent, a fire-retardant agent, an antistatic agent, a weather resistance modifying agent, an antioxidant, and a coloring agent, and a conductivity-imparting agent may be appropriately added to the synthetic resin. The method of adding these additives thereto is not limited to a specific method.

The method of mixing the resinous material and the pore-forming substance with each other is not specifically limited, but kneading methods such as dry blend, melt kneading, and the like generally used are applicable.

Further it is possible to use a method of dissolving the pore-forming substance in the liquid solvent to obtain a transparent solution, mixedly dispersing the resinous powder in the transparent solution, and thereafter removing this solvent.

The method of dispersing and mixing the resinous powder in the solution is not specifically limited, provided that the mixing can be accomplished in the solution. It is possible to use a ball mill, an ultrasonic dispersing machine, a homogenizer, a juicer mixer, a Henschel mixer, and the like. To restrain the separation of the dispersion solution, addition of a small amount of a surface active agent is effective. At a mixing time, the amount of the solvent should be so set as to completely dissolve the pore-forming substance by the mixing.

As the method of removing the solvent, it is possible to use a heating evaporation method, a vacuum evaporation method, a bubbling method to be carried out by using nitrogen gas, a dialyzing method, and a freeze-drying method. It is preferable to remove the liquid solvent by the heating evaporation method, because this method can be easily carried out, and equipment for carrying out this method is inexpensive.

In molding the mixture of the resin and the pore-forming substance, it is possible to adopt any desired molding methods such as a compression molding method, an injection molding method, an extrusion molding, a blow molding method, a vacuum molding method, a transfer molding method, and the like. To improve workability before performing a molding operation, the mixture may be processed into a pellet or a prepreg. It is preferable to mold the mixture in conformity to the configuration of the sliding member that is a final product. After the mixture is molded, an obtained molding is cut or the like to finish shaping thereof.

When the sliding material is used as the sliding bearing, so long as the lubricating property of the sliding bearing is not inhibited, it is possible to modify an intermediate product or an end product of the resin composition to improve the property thereof by chemical processing such as annealing or physical processing. To improve workability before molding the mixture, the sliding material may be processed into a pellet, a prepreg, and the like.

The pore-forming substance is extracted from the obtained molding by dissolving the pore-forming substance and cleaning the molding with the solvent not dissolving the above-described resin therein.

As the above-described solvent, it is possible to use water and solvents compatible with water, for example, an alcohol solvent, an ester solvent, and a ketone solvent. These solvents are appropriately selected according to the above-described condition independence on the kind of the resin and the pore-forming substance. These solvents may be used singly or by mixing not less than two kinds thereof with each other. It is preferable to use water, because waste water can be treated easily and costs low.

By performing the above-described extraction processing, a portion where the pore-forming substance has been present is dissolved, and pores are formed at a dissolved portion to thereby obtain the resinous porous article.

The sliding material of the present invention can be obtained by impregnating the resinous porous article with the lubricating oil.

As the lubricating oil impregnating the resinous porous article, without a specific limitation, it is possible to use lubricating oil generally used including mineral oil such as spindle oil, oil for a refrigerator, turbine oil, machine oil, dynamo oil, paraffin oil, naphthene oil, and the like; hydrocarbon-based synthetic oil such as polybutene, poly-α-olefin, alkylbenzene, alkylnaphthalene, alicyclic compounds; non-hydrocarbon-based synthetic oil such as natural fats and oils, polyol ester oil, phosphate ester, diester oil, polyglycol oil, silicone oil, polyphenyl ether oil, alkyldiphenyl ether oil, fluorinated oil, and the like.

As the lubricating oil which is used under a vacuum condition, an arbitrary lubricating oil having a vapor pressure not more than $1.0 \times 10^{-5}$ Pa at 40° C. can be used. When the vapor pressure of the lubricating oil at 40° C. is not more than $1.0 \times 10^{-5}$ Pa, the lubricating oil can be prevented from exhaling under vacuum and can be preferably used in a vacuum condition.

As the above-described lubricating oil, petroleum lubricating oil refined to a high extent to allow it to have the above-described low vapor pressure, alkylated cyclopentane oil, perfluoropolyether oil, and the like are listed.

It is preferable to use the alkylated cyclopentane oil because it is the lubricating oil which is capable of sufficiently withstanding the use in the vacuum condition, heat-resistant, chemical-resistant, solvent-resistant, and load-resistant. When a surface pressure to be applied to a rolling surface is low, the perfluoropolyether oil can be preferably used.

The alkylated cyclopentane oil is the lubricating oil having a chemical formula shown below:

[Chemical Formula 1]

where R denotes straight-chain or branched alkyl group, and m denotes integers of 3 to 4.

As examples of the alkylated cyclopentane oil, tri (2-octyldodecyl) cyclopentane (vapor pressure (40° C.): $1.0 \times 10^{-8}$ Pa, NYE SYNTHETIC OIL 2001A produced by NYE LUBRICANTS INC.) is used.

It is possible to use the perfluoropolyether oil of both the straight-chain type and the branched type, provided that they satisfy the above-described vapor pressure condition. As examples of the perfluoropolyether oil, DEMNUM S-200 (vapor pressure (40° C.): $1.0 \times 10^{-6}$ Pa produced by DAIKIN INDUSTRIES, LTD.), Fomblin YHVAC140/13 (vapor pressure (40° C.): $1.0 \times 10^{-9}$ Pa produced by Solvay Solexis Inc.), Fomblin Z25 (vapor pressure (40° C.): $1.0 \times 10^{-9}$ Pa produced by Solvay Solexis Inc.), Fomblin Z60 (vapor pressure (40° C.): $1.0 \times 10^{-11}$ Pa produced by Solvay Solexis Inc.), Krytox 143AC (vapor pressure (40° C.): $1.0 \times 10^{-5}$ Pa produced by Du-Pont Inc.), Krytox 143AD (vapor pressure (40° C.): $8.0 \times 10^{-7}$ Pa produced by Du-Pont Inc.), and Krytox L220 (vapor pressure (40° C.): $6.0 \times 10^{-8}$ Pa produced by Du-Pont Inc.) are listed.

The above-described lubricating oils can be used singly or as mixtures, provided that they satisfy the above-described vapor pressure condition.

Within a range in which the object of the present invention is not interfered, as necessary, it is possible to add extreme-pressure agent, antioxidant, rust preventive agent, pour point depressant, ashless dispersant, detergent-dispersant, surface active agent, anti-wear agent to the lubricating oil. As the antioxidant, phenol-based, amine-based, sulfur-based antioxidants can be used singly or as a mixture.

As the method of impregnating the sliding material of the present invention, a method capable of impregnating the inside of the resinous porous article can be used. A depressurizing impregnation of immersing the resinous porous article in an impregnating bath filled with the lubricating oil and thereafter impregnating the resinous porous article by depressurization is preferable. When silicone oil having a high viscosity is used, the resinous porous article can be impregnated by pressurization. Impregnation may be performed in combination of pressurization and depressurization.

As described above, the sliding material of the present invention does not contain the lubricating oil when it is molded. Thus it is possible to freely select resinous materials in a wide range from polyethylene resin, polyacetal resin, and the like whose molding temperatures are below 200° C. to polytetrafluoroethylene resin, polyether ether ketone resin, and the like whose molding temperatures exceed 300° C. and mix a filler with the resinous material without influence of the lubricating oil. For example when the resinous porous article is reinforced with fibers, the sliding material is allowed to have a high strength. When a resin having a high heat resistance and the lubricating oil are used, the sliding material is allowed to be heat-resistant.

A sintered metal which is a supporting portion of the sliding bearing of the present invention and used as a lubricating oil supply layer is described below.

Any lubricating oil supply layer disposed on the side disposed opposite to the sliding surface can be used, provided that it has a construction and is made of articles which hold the lubricating oil and is capable of supplying the sliding surface with the lubricating oil. The sintered metal can be preferably used as the lubricating oil supply layer. The sintered metal is capable of supplying the sliding surface with the lubricating oil, with the sintered metal maintaining an excellent dimensional accuracy. To maintain the dimensional accuracy, the thickness of the sintered metal is made larger than that of the resinous porous article layer. In the case of the sliding bearing of the present invention, most of the material forming the sliding bearing is made of the sintered metal.

As the sintered metal, a Fe-based sintered metal, a Cu-based sintered metal, and a Fe—Cu-based sintered metal are listed. The sintered metal may contain C, Zn, Sn, and the like as a component thereof. To improve the moldability and the release property thereof, a binder may be added to the sintered metal. It is possible to use an aluminum-based material containing Cu, Mg or Si and a metal-synthetic resinous material in which iron powder is joined with an epoxy synthetic resin. Further, to improve the adhesion of the sintered metal to the resinous porous article layer, it is possible to surface-treat the sintered metal or use an adhesive agent to such an extent that a molding operation is not inhibited.

To obtain a sliding bearing excellent in its mechanical strength and durability as well as its dimensional accuracy and rotational accuracy, the Fe-based sintered metal is preferable. The "Fe-based" means that the content of Fe is not less than 90% in a weight ratio. So long as this condition is satisfied, the sintered metal may contain other components such as Cu, Sn, Zn or C. "Fe" includes stainless steel.

The Fe-based sintered metal can be formed by molding a metal powder material (to improve the moldability and release property thereof, a small amount of a binder may be added thereto) containing Fe at the above-described content into a predetermined configuration, degreasing it, and as necessary, post-treating, for example, sizing a sintered material obtained by calcining it. Inside the sintered metal, a large number of internal pores are formed because the sintered metal has a porous tissue. A large number of surface openings are formed on the surface of the sintered metal, because the internal pores are open to the outside.

In the present invention, the thickness of the resinous porous article layer is important for maintaining dimensional accuracy. The relationship between the thickness of the resinous porous article layer and that of the lubricating oil supply layer is explained in detail with reference to table 1. In table 1, a temperature change-caused change of the clearance between a shaft 4 and a sliding bearing 1 constructed of a resinous porous article layer 2 (inner diameter: $D_1$, outer diameter: $D_2$) formed as the inner layer thereof and a sintered metal layer 3 (inner diameter: $D_2$, outer diameter: $D_3$) formed as the outer layer thereof is investigated. As the shaft 4, an aluminum alloy (A5056) having a diameter of φ7.97 mm was used. The clearance between the shaft and the inner layer of the sliding bearing at 20° C. was set to 30 μm. When the temperature of the entirety is increased to 60° C. in this state, the expansion of the volume of the resinous porous article layer 2 is restrained by the sintered metal layer 3 and hence shifts radially inwardly. As a result, the clearance decreases. The resinous porous article layer 2 and the sintered metal layer 3 are in close contact without a clearance formed therebetween. The coefficient of linear thermal expansion (/K) of the investigated materials are as shown below:

Aluminum alloy (A5056) serving as material of shaft: 0.000023

Sintered metal serving as outer layer of bearing: 0.00002

Polyethylene (PE) resin serving as inner layer of bearing: 0.00013

Polyphenylene sulfide (PPS) resin serving as inner layer of bearing: 0.00006

Table 1

| | Dimension, mm | | | | Thickness of resinous porous material, mm | Thickness of sintered metal, mm | Decrease amount of clearance, μm | |
|---|---|---|---|---|---|---|---|---|
| | $D_1$ | $D_2$ | $D_3$ | $D_4$ | $(D_2-D_1)/2$ | $(D_3-D_2)/2$ | PE | PPS |
| 1 | 8.0 | 8.1 | 16.0 | 7.97 | 0.05 | 3.95 | -1.5 | -1.1 |
| 2 | 8.0 | 8.5 | 16.0 | 7.97 | 0.25 | 3.75 | -3.6 | -1.9 |
| 3 | 8.0 | 9.0 | 16.0 | 7.97 | 0.5 | 3.5 | -6.3 | -2.8 |
| 4 | 8.0 | 10.0 | 16.0 | 7.97 | 1.0 | 3.0 | -11.0 | -4.6 |
| 5 | 8.0 | 12.0 | 16.0 | 7.97 | 2.0 | 2.0 | -19.9 | -7.5 |

As shown in table 1, when a resin having a large coefficient of linear thermal expansion is used and when the thickness ($T_1$) of the resinous porous article layer 2 is increased, the change of the clearance becomes large, which causes the occurrence of nonuniform rotation and is thus unpreferable. To decrease the change of the clearance, it is necessary to decrease the thickness of the resinous porous article layer 2. A favorable range of the thickness of the resinous porous article layer 2 is not more than 1000 μm and a more favorable range of the thickness thereof is not more than 500 μm, although the range of the thickness thereof depends on the value of the coefficient of linear thermal expansion thereof.

The sintered metal and the resinous porous article layer having the interconnected hole are joined with each other by methods capable of fixing them to each other. For example, it is possible to adopt press fit, fixing with a pin, coating, and physical separation preventive means.

As oil with which the sintered metal or the resinous porous article layer is impregnated, the above-described oils can be used for the sliding material. Within the range in which the object of the present invention is not interfered, as necessary, it is possible to add extreme-pressure agent, antioxidant, rust preventive agent, pour point depressant, ashless dispersant, detergent-dispersant, surface active agent, anti-wear agent to the lubricating oil. As the antioxidant, phenol-based, amine-based, sulfur-based antioxidants can be used singly or as a mixture.

As the method of impregnating the sliding material of the present invention, a method capable of impregnating the inside of the resinous porous article can be used. A depressurizing impregnation of immersing the resinous porous article in an impregnating bath filled with the lubricating oil and thereafter impregnating the resinous porous article by depressurization is preferable. When silicone oil having a high viscosity is used, the resinous porous article can be impregnated by pressurization. Impregnation may be performed in combination of pressurization and depressurization.

Figure 1:
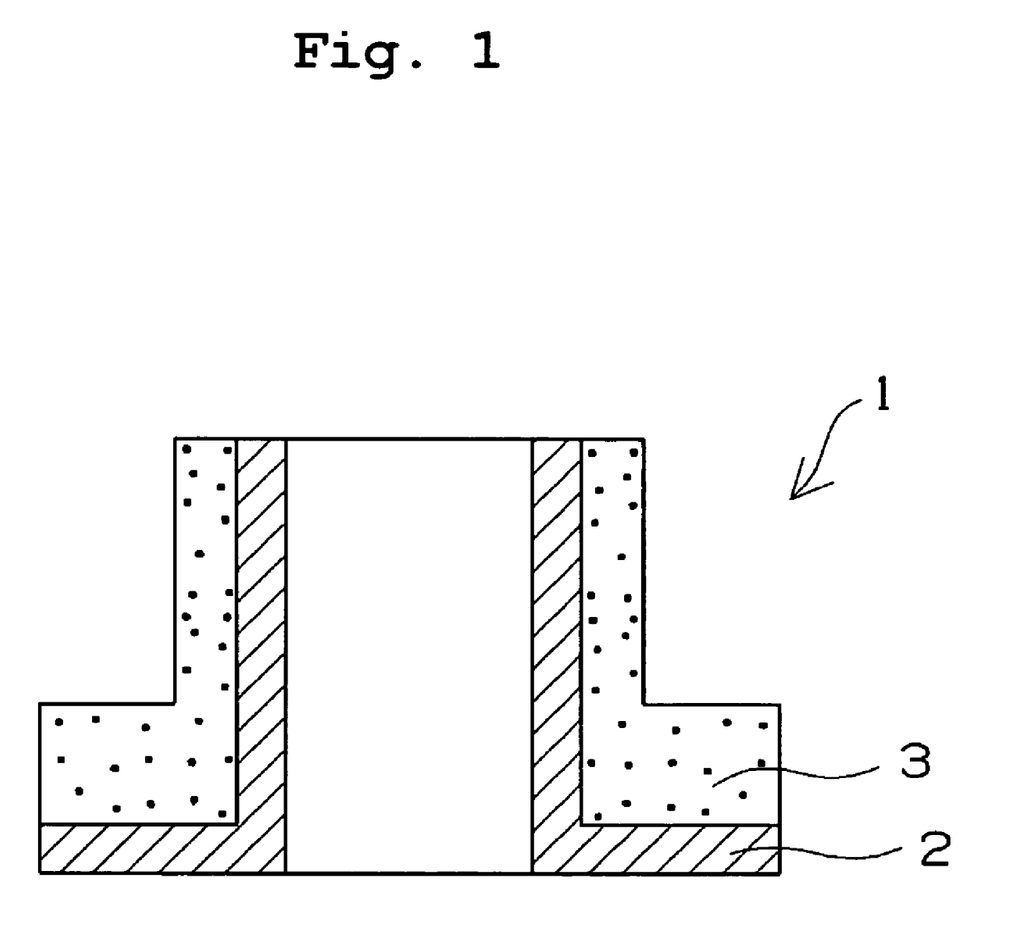
FIG. 1 is a sectional view of a flange-provided bush-type sliding bearing.
Figure 2:
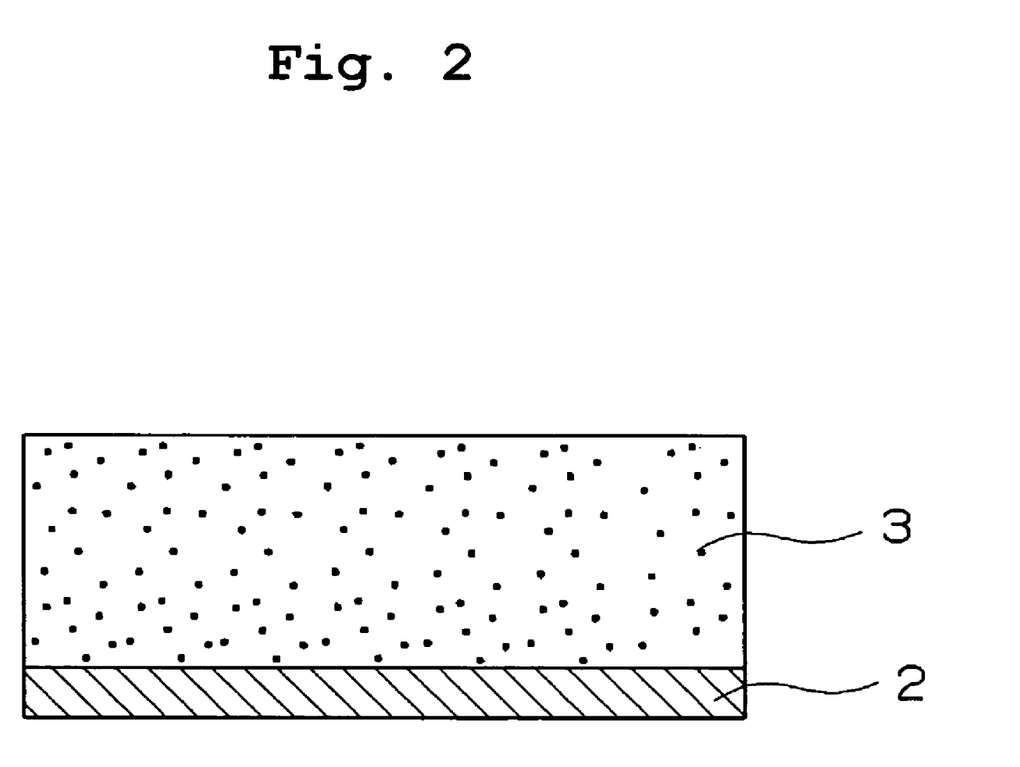
FIG. 2 is a sectional view of a thrust-type sliding bearing.
Figure 3:
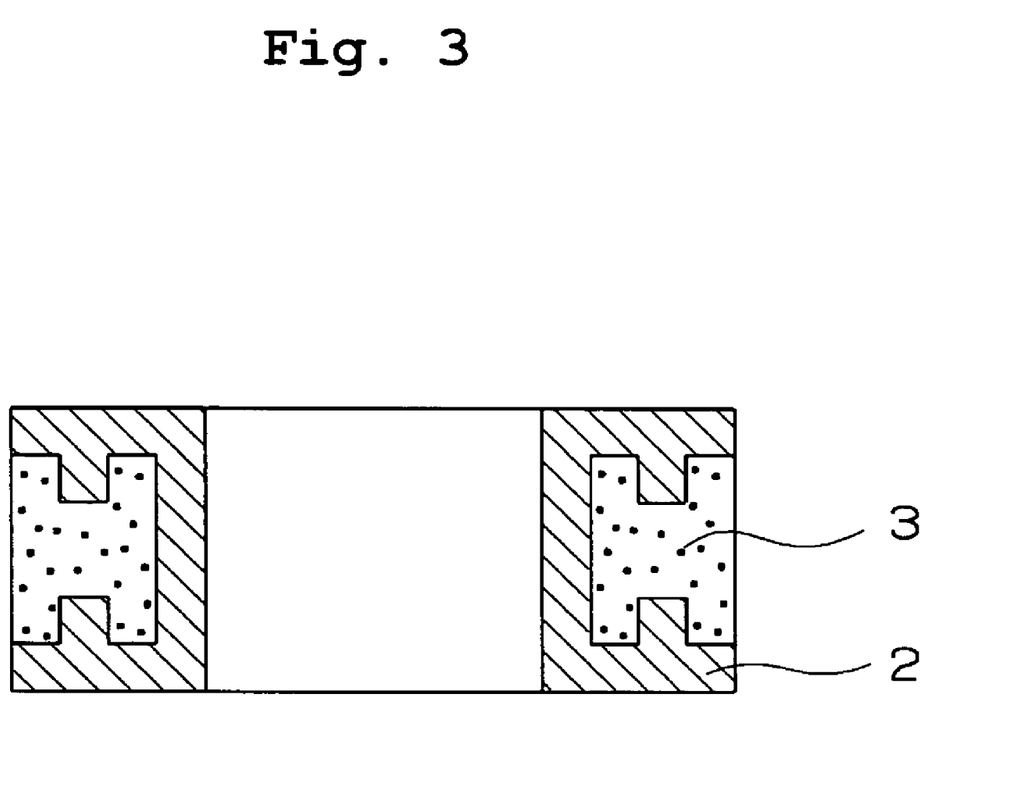
FIG. 3 is a sectional view of radial-type sliding bearing.
Figure 4:
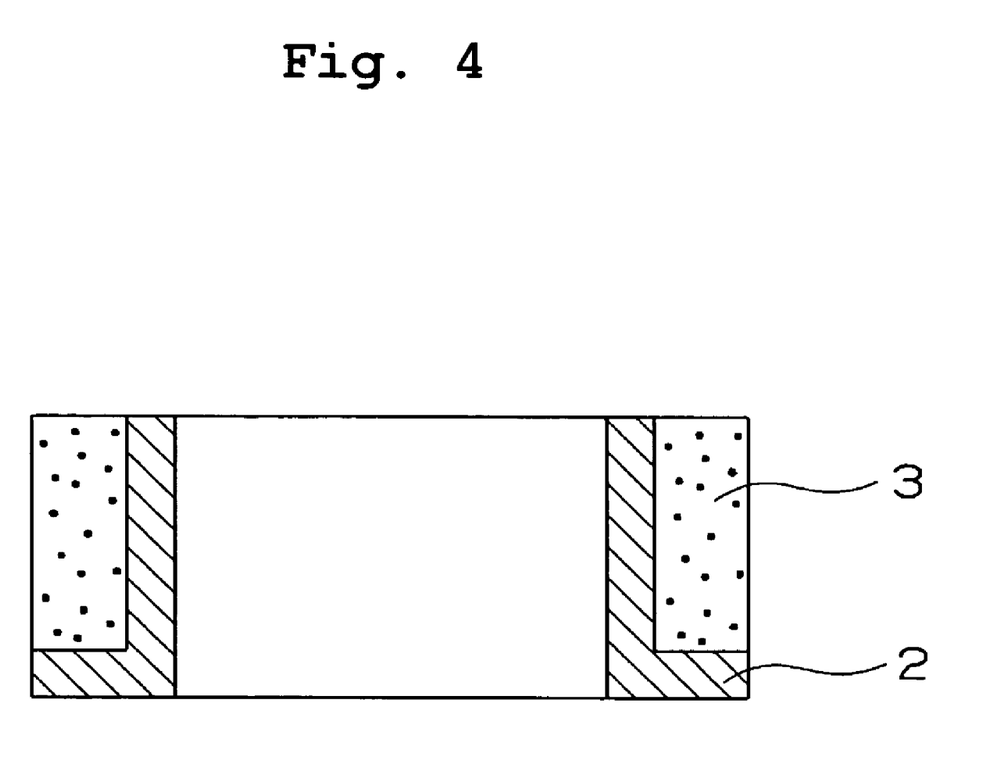
FIG. 4 is a sectional view of a sliding bearing of a mixed-type in combination of the thrust-type and the radial-type with each other.
Figure 5:
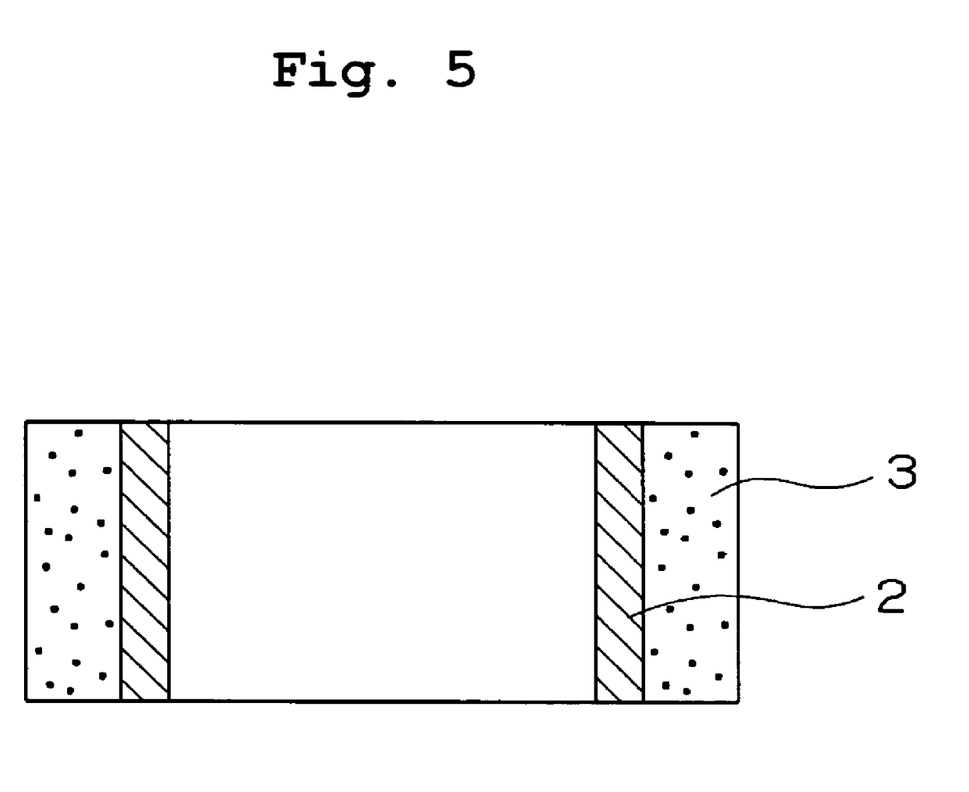
FIG. 5 is a sectional view of a sliding bearing of the mixed-type in combination of the thrust-type and the mixed type mixed with each other.

A sliding bearing composed of the sliding material of the present invention is described below with reference to FIGS. 1 through 5. FIGS. 1 through 5 are sectional views of the sliding bearing.

In a sliding bearing 1, a sliding surface consists of a resinous porous article layer 2, and a sintered metal layer 3 serving as a lubricating oil supply layer is formed on a rear surface of the resinous porous article layer 2, with the sintered metal layer 3 disposed opposite to the sliding surface.

The configuration of the sliding bearing 1 includes a flange-provided bush-type sliding bearing (FIG. 1), a thrust-type sliding bearing (FIG. 2), a radial-type sliding bearing (FIG. 3), a sliding bearing (FIGS. 4, 5) of a mixed-type in combination of the thrust-type and the radial-type. In conformity to the configuration of the sliding portion, an optimum bearing configuration can be selected. In addition, it is possible to form a groove on the sliding surface.

EXAMPLES

The examples of the sliding material of the present invention are described below.

Example 1

Powder of the ultra-high-molecular-weight polyethylene (MIPELON XM220 produced by Mitsui Chemicals Inc.) and powder of sodium benzoate (reagent produced by Wako Pure Chemical Industries, Ltd.) were mixed with each other at a volume ratio of 50:50 for five minutes by using a mixer to obtain mixed powder. After the obtained mixed powder was molded by heating and compressing it (200° C.×30 minutes), it was cut into a molding having a predetermined size (specimen having a size of ϕ3 mm×13 mm). The molding was cleaned with hot water having a temperature of 80° C. for 10 hours by using an ultrasonic cleaner to elute the sodium benzoate. Thereafter the molding was dried at 100° C. for eight hours to obtain a porous article having an interconnected hole porosity of 48%. The porous article was impregnated with silicone oil (KF96H-6000 (kinematic viscosity: 6000 mm$^2$/s (25° C.) produced by Shin-Etsu Chemical Co., Ltd.)) at 60° C. under vacuum to obtain a specimen. The oil impregnation percentage was 45% with respect to the entire volume of the porous article.

Example 2

Powder of polyether ether ketone resin (150PF produced by Victrex Inc.) and the powder of the sodium benzoate (produced by Wako Pure Chemical Industries, Ltd.) were mixed with each other at a volume ratio of 50:50 for five minutes by using the mixer to obtain mixed powder. After the obtained mixed powder was molded by heating and compressing it (360° C.×30 minutes), it was cut into a molding having a predetermined size (specimen having a size of ϕ3 mm×13 mm). The molding was cleaned with hot water having a temperature of 80° C. for 10 hours by using the ultrasonic cleaner to elute the sodium benzoate. Thereafter the molding was dried at 100° C. for eight hours to obtain a porous article having an interconnected hole porosity of 48%. The porous article was impregnated with the silicone oil (KF96H-6000 (kinematic viscosity: 6000 mm$^2$/s (25° C.) produced by Shin-Etsu Chemical Co., Ltd.)) at 60° C. under vacuum to obtain a specimen. The oil impregnation percentage was 45% with respect to the entire volume of the porous article.

Example 3

The powder of the polyether ether ketone resin (150PF produced by Victrex Inc.), carbon fiber (MLD100 produced by Toray Industries Inc.), and the powder of the sodium benzoate (produced by Wako Pure Chemical Industries, Ltd.) were mixed with each other at a volume ratio of 40:10:50 for five minutes by using the mixer to obtain mixed powder. After the obtained mixed powder was molded by heating and compressing it (360° C.×30 minutes), it was cut into a molding having a predetermined size (specimen having a size of ϕ3 mm×13 mm). The molding was cleaned with hot water having a temperature of 80° C. for 10 hours by using the ultrasonic cleaner to elute the sodium benzoate. Thereafter the molding was dried at 100° C. for eight hours to obtain a porous article having an interconnected hole porosity of 48%. The porous article was impregnated with the silicone oil (KF96H-6000 (kinematic viscosity: 6000 mm$^2$/s (25° C.) produced by Shin-Etsu Chemical Co., Ltd.)) at 60° C. under vacuum to obtain a specimen. The oil impregnation percentage was 45% with respect to the entire volume of the porous article.

Example 4

The powder of the polyether ether ketone resin (150PF produced by Victrex Inc.), the carbon fiber (MLD100 produced by Toray Industries Inc.), and powder of sodium triphosphate (sodium tripolyphosphate produced by TAIHEI CHEMICAL INDUSTRIAL CO., LTD.) were mixed with each other at a volume ratio of 40:10:50 for five minutes by using the mixer to obtain mixed powder. After the obtained mixed powder was molded by heating and compressing it (360° C.×30 minutes), it was cut into a molding having a predetermined size (specimen having a size of φ3 mm×13 mm). The molding was cleaned with hot water having a temperature of 80° C. for 10 hours by using the ultrasonic cleaner to elute the sodium triphosphate. Thereafter the molding was dried at 100° C. for eight hours to obtain a porous article having an interconnected hole porosity of 48%. The porous article was impregnated with the silicone oil (KF96H-6000 (kinematic viscosity: 6000 mm$^2$/s (25° C.) produced by Shin-Etsu Chemical Co., Ltd.)) at 60° C. under vacuum to obtain a specimen. The oil impregnation percentage was 45% with respect to the entire volume of the porous article.

Example 5

The powder of polyether ether ketone resin (150PF produced by Victrex Inc.), the carbon fiber (MLD100 produced by Toray Industries Inc.), and powder of calcium nitride (produced by Wako Pure Chemical Industries, Ltd.) were mixed with each other at a volume ratio of 40:10:50 for five minutes by using the mixer to obtain mixed powder. After the obtained mixed powder was molded by heating and compressing it (360° C.×30 minutes), it was cut into a molding having a predetermined size (specimen having a size of φ3 mm×13 mm). The molding was cleaned with hot water having a temperature of 80° C. for 10 hours by using the ultrasonic cleaner to elute the calcium nitride. Thereafter the molding was dried at 100° C. for eight hours to obtain a porous article having an interconnected hole porosity of 48%. The porous article was impregnated with the silicone oil (KF96H-6000 (kinematic viscosity: 6000 mm$^2$/s (25° C.) produced by Shin-Etsu Chemical Co., Ltd.)) at 60° C. under vacuum to obtain a specimen. The oil impregnation percentage was 45% with respect to the entire volume of the porous article.

Comparison Example 1

After the powder of the ultra-high-molecular-weight polyethylene (MIPELON XM220 produced by Mitsui Chemicals Inc.) and the silicone oil (KF96H-6000 produced by Shin-Etsu Chemical Co., Ltd.)) were mixed with each other at a volume ratio of 90:10 for five minutes by using the mixer, the obtained mixed powder was molded by heating and compressing it (200° C.×30 minutes). Thereafter it was cut to obtain a specimen having a predetermined size (φ3 mm×13 mm).

A pin-on-disk test was conducted on the specimens obtained in the examples 1 through 5 and the comparison example 1 by bringing the φ3 mm-surface of each specimen into contact with a rotating disk. The test conditions are shown below:

Specimen: φ3 mm×13 mm, diameter of orbit: 23 mm

Mating member: φ33 mm×6 mm, aluminum alloy A5056 (surface roughness Ra=0.5 μm)

Surface pressure: 3 MPa

Peripheral speed: 4.2 m/minute

Temperature: normal temperature (25° C.)

Period of time: 20 hours

As the evaluating method, the wear amount was computed from the difference between the length of a pin before the test was conducted and that of the pin after the test was conducted. Table 2 shows the result as well as the kinematic coefficient of friction of each specimen.

TABLE 2

| | Specific wear amount (×10$^{-8}$ mm$^3$/(N·m)) | Kinematic coefficient of friction |
|---|---|---|
| Example | | |
| 1 | 50 | 0.05 |
| 2 | 30 | 0.05 |
| 3 | 20 | 0.05 |
| 4 | 20 | 0.05 |
| 5 | 20 | 0.05 |
| Comparison example | | |
| 1 | 200 | 0.15 |

As shown in table 2, all of the specimens of the examples 1 through 5 consisting of the sliding materials of the present invention had a specific wear amount of not more than 50×10$^{-8}$ mm$^3$/(N·m). They were excellent in the wear resistance thereof. They showed a low value of 0.05 in the kinematic coefficient of friction thereof.

Examples of sliding materials used in a vacuum condition are described below.

Example 6

The powder of the polyether ether ketone resin (150PF produced by Victrex Inc.) and the powder of the sodium benzoate (produced by Wako Pure Chemical Industries, Ltd.) were mixed with each other at a volume ratio of 50:50 for five minutes by using the mixer to obtain mixed powder. After the obtained mixed powder was molded by heating and compressing it (360° C.×30 minutes), it was cut into a molding having a predetermined size (specimen having a size of φ3 mm×13 mm). The molding was cleaned with hot water having a temperature of 80° C. for 10 hours by using the ultrasonic cleaner to elute the sodium benzoate. Thereafter the molding was dried at 100° C. for eight hours to obtain a porous article having an interconnected hole porosity of 48%. The porous article was impregnated with alkylated cyclopentane oil (NYESYNTHETIC OIL 2001A produced by NYE LUBRICANTS) under vacuum to obtain a specimen. The oil impregnation percentage was 45% with respect to the entire volume of the porous article.

Example 7

The powder of the polyether ether ketone resin (150PF produced by Victrex Inc.) and the powder of the sodium benzoate (produced by Wako Pure Chemical Industries, Ltd.) were mixed with each other at a volume ratio of 50:50 for five minutes by using the mixer to obtain mixed powder. After the obtained mixed powder was molded by heating and compressing it (360° C.×30 minutes), it was cut into a molding having a predetermined size (specimen having a size of φ3 mm×13 mm). The molding was cleaned with hot water having a temperature of 80° C. for 10 hours by using the ultrasonic cleaner to elute the sodium benzoate. Thereafter the molding was dried at 100° C. for eight hours to obtain a porous article having an interconnected hole porosity of 48%. The porous article was impregnated with perfluoropolyether oil (Fomblin Z60 produced by Solvay Solexis Inc.) under vacuum to obtain a specimen. The oil impregnation percentage was 45% with respect to the entire volume of the porous article.

Example 8

The powder of the polyether ether ketone resin (150PF produced by Victrex Inc.), the carbon fiber (MLD100 produced by Toray Industries Inc.), and the powder of the sodium benzoate (produced by Wako Pure Chemical Industries, Ltd.) were mixed with each other at a volume ratio of 40:10:50 for five minutes by using the mixer to obtain mixed powder. After the obtained mixed powder was molded by heating and compressing it (360° C.×30 minutes), it was cut into a molding having a predetermined size (specimen having a size of φ3 mm×13 mm). The molding was cleaned with hot water having a temperature of 80° C. for 10 hours by using the ultrasonic cleaner to elute the sodium benzoate. Thereafter the molding was dried at 100° C. for eight hours to obtain a porous article having an interconnected hole porosity of 48%. The porous article was impregnated with the alkylated cyclopentane oil (NYESYNTHETIC OIL 2001A produced by NYE LUBRICANTS) under vacuum to obtain a specimen. The oil impregnation percentage was 45% with respect to the entire volume of the porous article.

Example 9

The powder of the polyether ether ketone resin (150PF produced by Victrex Inc.), the carbon fiber (MLD100 produced by Toray Industries Inc.), and the powder of the sodium triphosphate (sodium tripolyphosphate produced by TAIHEI CHEMICAL INDUSTRIAL CO., LTD.) were mixed with each other at a volume ratio of 40:10:50 for five minutes by using the mixer to obtain mixed powder. After the obtained mixed powder was molded by heating and compressing it (360° C.×30 minutes), it was cut into a molding having a predetermined size (specimen having a size of φ3 mm×13 mm). The molding was cleaned with hot water having a temperature of 80° C. for 10 hours by using the ultrasonic cleaner to elute the sodium triphosphate. Thereafter the molding was dried at 100° C. for eight hours to obtain a porous article having an interconnected hole porosity of 48%. The porous article was impregnated with the alkylated cyclopentane oil (NYESYNTHETIC OIL 2001A produced by NYE LUBRICANTS) under vacuum to obtain a specimen. The oil impregnation percentage was 45% with respect to the entire volume of the porous article.

Example 10

The powder of the polyether ether ketone resin (150PF produced by Victrex Inc.), the carbon fiber (MLD100 produced by Toray Industries Inc.), and the powder of the calcium nitride (produced by Wako Pure Chemical Industries, Ltd.) were mixed with each other at a volume ratio of 40:10:50 for five minutes by using the mixer to obtain mixed powder. After the obtained mixed powder was molded by heating and compressing it (360° C.×30 minutes), it was cut into a molding having a predetermined size (specimen having a size of φ3 mm×13 mm). The molding was cleaned with hot water having a temperature of 80° C. for 10 hours by using the ultrasonic cleaner to elute the calcium nitride. Thereafter the molding was dried at 100° C. for eight hours to obtain a porous article having an interconnected hole porosity of 48%. The porous article was impregnated with the alkylated cyclopentane oil (NYESYNTHETIC OIL 2001A produced by NYE LUBRICANTS) under vacuum to obtain a specimen. The oil impregnation percentage was 45% with respect to the entire volume of the porous article.

Comparison Example 2

The powder of polyphenylene sulfide resin (T4AG produced by DAINIPPON INK AND CHEMICALS, Inc.) and the alkylated cyclopentane oil (NYESYNTHETIC OIL 2001A produced by NYE LUBRICANTS) were mixed with each other at a volume ratio of 95:5 for five minutes by using the mixer to obtain mixed powder. After the obtained mixed powder was molded by heating and compressing it (330° C.×30 minutes), it was cut into a molding having a predetermined size (specimen having a size of φ3 mm×13 mm).

A pin-on-disk test was conducted on the specimens obtained in the examples 6 through 10 and the comparison example 2 by bringing the φ3 mm-surface of each specimen into contact with a rotating disk. The test conditions are shown below:

Specimen: φ3 mm×13 mm, diameter of orbit: 23 mm
Mating member: φ3 mm×6 mm, SUS440C (Hardness: HRC60, surface roughness Ra=0.5 μm)
Surface pressure: 1 MPa
Vacuum degree: $1 \times 10^{-5}$ to $10 \times 10^{-5}$ Pa
Peripheral speed: 4.2 m/minute
Temperature: normal temperature (25° C.)
Period of time: 20 hours As the evaluating method, the wear amount was computed from the difference between the length of a pin before the test was conducted and that of the pin after the test was conducted. Table 3 shows the result as well as the kinematic coefficient of friction of each specimen.

TABLE 3

|  | Specific wear amount ($\times 10^{-8}$ mm$^3$/(N·m)) | Kinematic coefficient of friction |
| --- | --- | --- |
| Example |  |  |
| 6 | 100 | 0.05 |
| 7 | 100 | 0.05 |
| 8 | 200 | 0.05 |
| 9 | 200 | 0.05 |
| 10 | 200 | 0.05 |
| Comparison example |  |  |
| 2 | Not less than 3000 (Test was suspended because specimen wore in large amount) | 0.30 |

As shown in table 3, the specimens of the examples 6 through 10 each consisting of the sliding material of the present invention had smaller specific wear amounts than that of the specimen of the comparison example 2 and were excellent in the wear resistance thereof. They showed a low value of 0.05 in the kinematic coefficient of friction thereof.

Examples of the sliding bearing are described below.

Example 11

Powder of polyamide (nylon 6) resin and the powder of the sodium benzoate (produced by Wako Pure Chemical Industries, Ltd.) were mixed with each other at a volume ratio of 50:50 for five minutes by using the mixer to obtain mixed powder. The obtained mixed powder was molded into a resinous cylinder having an inner diameter of φ8 mm× an outer diameter of φ8.7 mm× a height t of 3 mm. The molding was cleaned with hot water having a temperature of 80° C. by using the ultrasonic cleaner for 10 hours to elute the sodium benzoate. Thereafter the molding was dried at 100° C. for eight hours to obtain a cylinder made of a resinous porous article having an interconnected hole porosity of 49%. A cylinder made of a sintered metal (interconnected hole porosity: 30%, Cu—Sn-based) having an inner diameter of φ8.5 mm× an outer diameter of φ16 mm× a height t of 3 mm was prepared. After the cylinder made of the resinous porous article was fitted into the cylinder made of the sintered metal by press fit, the inner-diameter surface was processed to obtain a sliding bearing having an inner diameter of φ8 mm× an outer diameter of φ16 mm× a height t of 3 mm. The sliding bearing was immersed in ester oil (H481R produced by NOF CORPORATION) to impregnation the sliding bearing therewith under vacuum, and oil was filled in porous portions. Table 4 shows results.

By using the sliding bearing, a test of a radial sliding bearing was conducted under the following conditions. Table 4 shows the results.

The condition of friction and wear test is shown below:
(1) Mating shaft: A5056 (aluminum alloy, Ra=0.8 μm), φ7.97 mm
(2) Load: 24.5 N
(3) Peripheral speed: 3 m/minute
(4) Temperature: 50° C.
(5) Period of time: 120 hours The clearance between the shaft and the sliding bearing was set to 30 μm (measured at 25° C.). The bearing was immersed in water (temperature: 25° C.) for 150 hours to measure a dimensional change thereof (outer-diameter portion). Bearings which had a dimensional change of not more than 30 μm were evaluated as "good", whereas bearing which had a dimensional change of not less than 30 μm was evaluated as "poor". The measured items were (a): whether or not the sliding bearing wore, (b): whether or not the shaft wore, (c): the kinematic coefficient of friction at the time when the test finished, (d) wrap around the shaft, and (e): the dimensional change (evaluated as "good" or "poor") at the time of water absorption.

Comparison Example 3

A cylinder made of the sintered metal (interconnected hole porosity: 30%, Cu—Sn-based) having an inner diameter of φ8 mm×an outer diameter of φ16 mm× a height t of 3 mm was used as the sliding bearing. The bearing made of the sintered metal was immersed in the ester oil (H481R produced by NOF CORPORATION) to impregnate the bearing therewith under vacuum, and oil was filled in porous portions. By using this sliding bearing, in a condition similar to that of the example 11, a friction and wear test was conducted and a dimensional change was measured by allowing the sliding bearing to stand in water. Table 4 shows results.

Comparison example 4

The powder of the polyamide (nylon 6) and the powder of the sodium benzoate (produced by Wako Pure Chemical Industries, Ltd.) were mixed with each other at a volume ratio of 70:30 for five minutes by using the mixer to obtain mixed powder. The obtained mixed powder was molded into a resinous cylinder having an inner diameter of φ8 mm× an outer diameter of φ16 mm× a height t of 3 mm. The molding was cleaned with hot water having a temperature of 80° C. by using the ultrasonic cleaner for 10 hours to elute the sodium benzoate. Thereafter the molding was dried at 100° C. for eight hours to obtain a cylinder made of a resinous porous article having an interconnected hole porosity of 29%. The cylinder made of the sintered metal was immersed in the ester oil (H481R produced by NOF CORPORATION) to impregnate the cylinder therewith under vacuum, and oil was filled in porous portions. By using this cylinder made of the resinous porous article as the sliding bearing, in a condition similar to that of the example 11, a friction and wear test was conducted and a dimensional change was measured by allowing the sliding bearing to stand in water. Table 4 shows results.

TABLE 4

|  | Example | Comparison example | |
| --- | --- | --- | --- |
|  | 11 | 3 | 4 |
| Wear of bearing | None | Yes (worn) | None |
| Wear of shaft | None | Yes (worn) | None |
| Kinematic coefficient of friction | 0.05 | 0.35 | 0.12 |
| Wrap of bearing around shaft | None | None | Yes (wrapped) |
| Dimensional change at water absorption time | good | good | poor |

As shown in table 4, in the example 11 composed of the sintered metal and the resinous porous article layer, the bearing nor the mating shaft wore. The bearing showed a very low value of 0.05 in the kinematic coefficient of friction thereof. Further the amount of dimensional change caused by the water absorption was very small.

On the other hand, in the sliding bearing of the comparison example 3 composed of only the sintered metal, the bearing and the mating shaft wore. The specimen showed a high coefficient of friction of 0.35. In the comparison example 4 in which the sliding bearing consisted of the resinous porous article, the bearing nor the mating shaft wore, but the amount of dimensional change caused by the water absorption was large, the bearing wrapped around the shaft.

INDUSTRIAL APPLICABILITY

The sliding material of the present invention has a high heat resistance, a low coefficient of friction, and excellent in a wear resistance and can be preferably used as sliding members such as a sliding bearing, a gear, a sliding sheet, a seal ring, a roller, a retainer of a rolling bearing, a seal of the rolling bearing, a direct-acting seal, a spacer interposed between balls of a ball thread, a race of a rolling bearing, and carriages.

The sliding material of the present invention does not generate a gas from the lubricating oil even when the sliding material is used under vacuum, is low out particle, and can be used for a long time. Therefore the sliding material can be preferably used as a basic material of an apparatus used in a vacuum condition and an apparatus used in a clean room.

EXPLANATION OF REFERENCE NUMERALS AND SYMBOLS

1: sliding bearing
2: resinous porous article layer
3: sintered metal layer

The invention claimed is:
1. A sliding material comprising a resinous porous article having an interconnected hole porosity of not less than 30% and a lubricating oil which impregnates said resinous porous article wherein said resinous porous article has an interconnected hole formed by molding a resin mixed with a pore-forming substance into said resin, and extracting said pore-forming substance from said molded article with a solvent which dissolves said pore-forming substance and does not dissolve said resin, wherein said pore-forming substance is alkali.

2. The sliding material according to claim 1, wherein said interconnected hole porosity is in a range of 30 to 90%.

3. The sliding material according to claim 1, wherein said pore-forming substance is at least one compound selected from compounds of inorganic salts and compounds of organic salts, wherein said pore-forming substance has a melting point higher than a molding temperature of said resin.

4. The sliding material according to claim 3, wherein said pore-forming substance is water-soluble.

5. The sliding material according to claim 1, wherein said alkali substance is at least one metal salt selected from alkali metal salts and alkali earth metal salts.

6. The sliding material according to claim 1, wherein said lubricating oil has a vapor pressure of not more than $1.0 \times 10^{-5}$ Pa at 40° C.

7. The sliding material according to claim 6, wherein said lubricating oil is alkylated cyclopentane oil.

8. The sliding material according to claim 6, wherein said lubricating oil is perfluoropolyether oil.

9. A sliding bearing comprising a sliding material having a sliding surface which slides on a mating member; and a lubricating oil supply layer which supports said sliding material and supplies said sliding surface with said lubricating oil, wherein said sliding material is formed of a sliding material according to claim 1.

10. The sliding bearing according to claim 9, wherein said lubricating oil supply layer is formed of a sintered metal.

11. The sliding bearing according to claim 10, wherein said sintered metal consists of an iron-based metal.

12. The sliding material according to claim 1, wherein said alkali substance is at least one metal salt selected from organic alkali metal salts and organic alkali earth metal salts.

13. The sliding material according to claim 1, wherein said alkali substance is at least one metal salt selected from among sodium benzoate, sodium acetate, sodium sebacate, sodium triphosphate, sodium pyrophosphate and potassium carbonate.

* * * * *